Patented Oct. 19, 1937

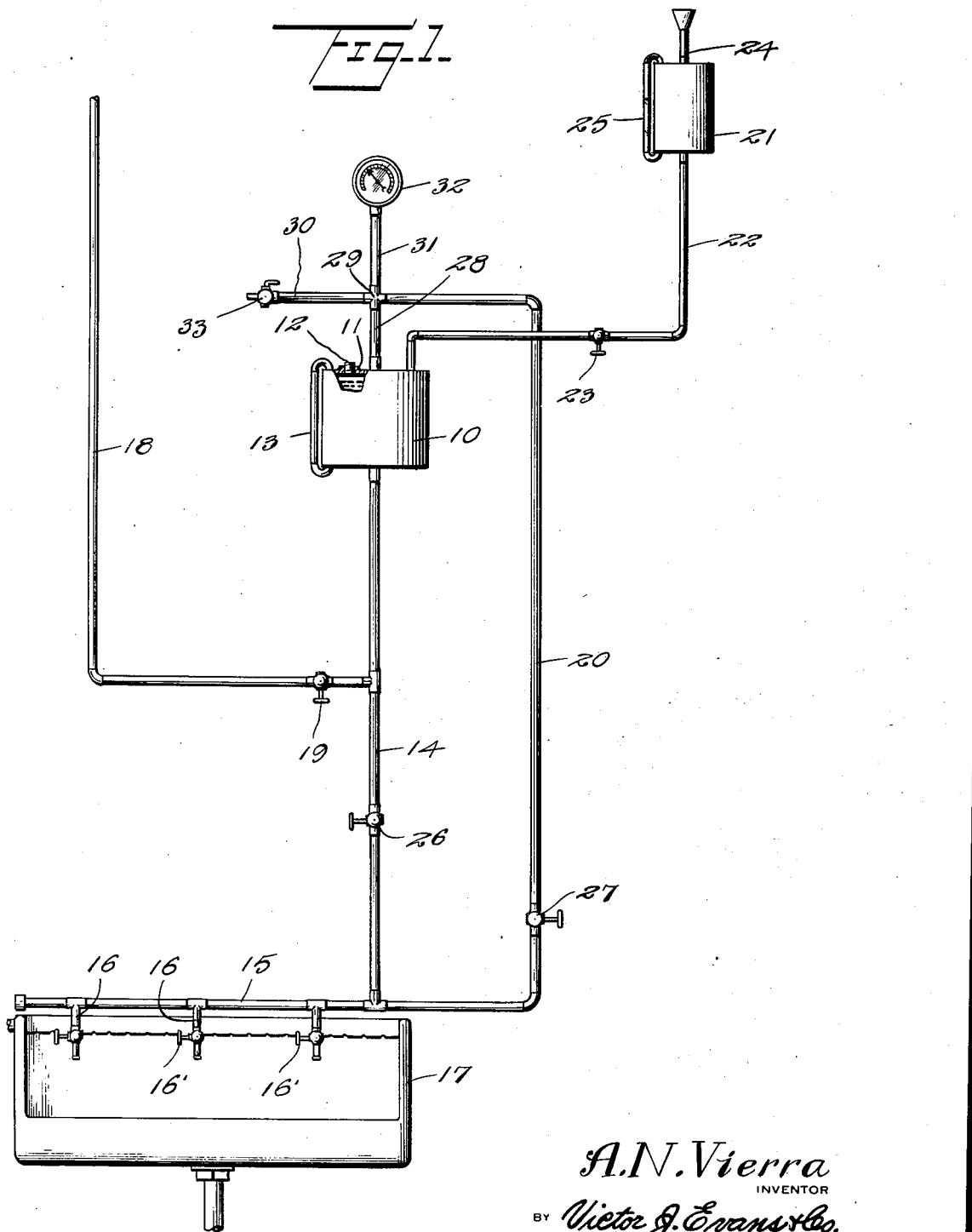

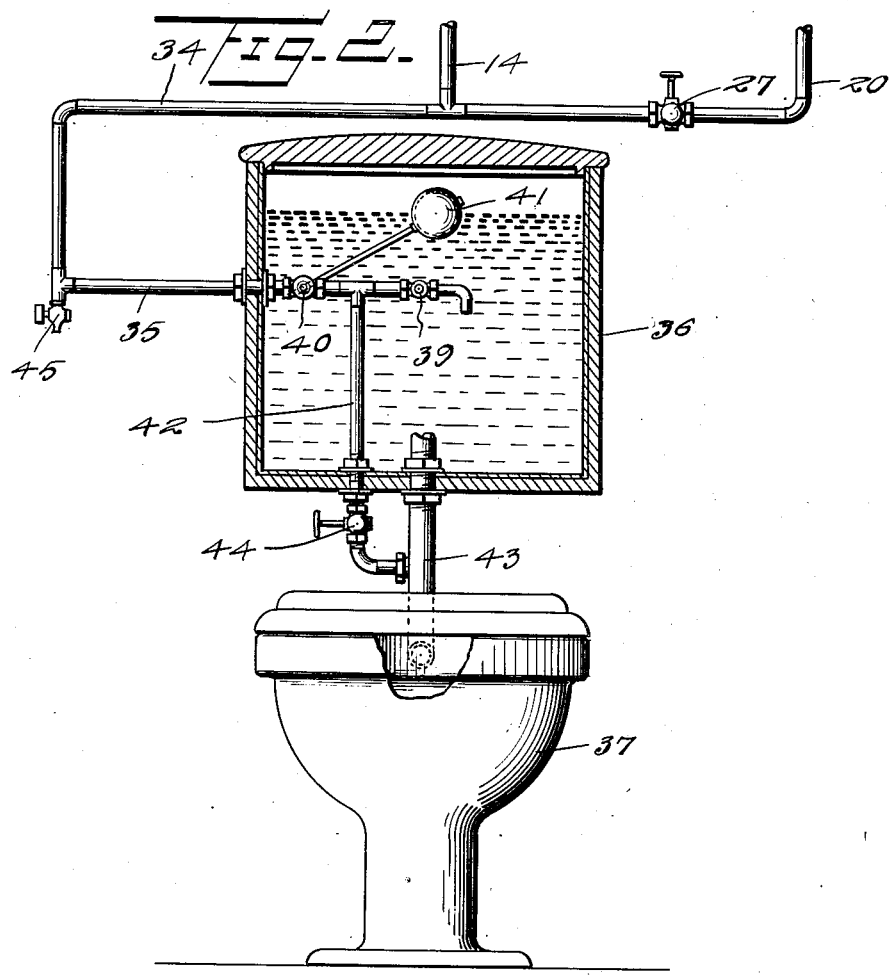
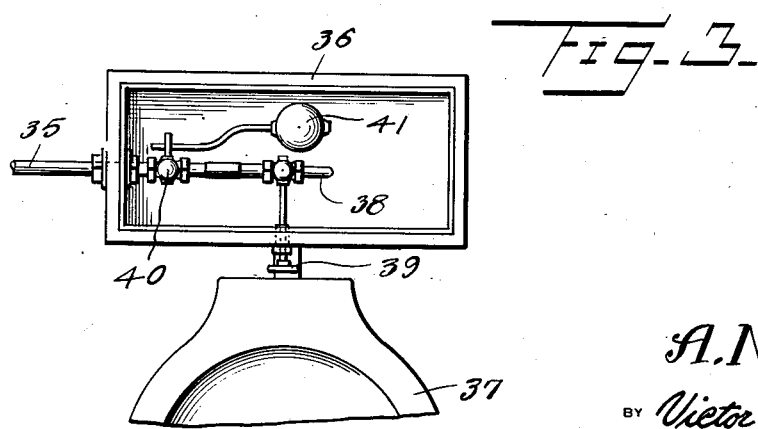

2,096,657

UNITED STATES PATENT OFFICE 2,096,657

DISINFECTING DEVICE

Antone Nunes Vierra, Honolulu, Territory of Hawaii

Application December 28, 1936, Serial No. 118,012

3 Claims. (Cl. 4—222)

This invention relates to disinfecting devices more particularly adapted to disinfect and deodorize lavatories and other equipment of homes, schools, hospitals, factories and other buildings.

An object of the invention is to provide apparatus by means of which a slow and continuous flow or an intermittent flow, of disinfecting and deodorizing liquid may be selectively maintained, through the use of water pressure in the service pipes of the building, or by gravity.

A further object is to provide apparatus of this type which will be formed of a few strong simple and durable parts, which will be inexpensive to manufacture and install, and which will not easily get out of order.

With the above and other objects in view the invention consists of certain novel details of construction and combinations of parts hereinafter fully described and claimed, it being understood that various modifications may be resorted to within the scope of the appended claims without departing from the spirit or sacrificing any of the advantages of the invention.

In the accompanying drawings forming part of this specification,

Figure 1 is a front elevation of apparatus constructed in accordance with the invention associated with a conventional urinal.

Figure 2 is a front elevation of a part of the apparatus having a float valve controlled outlet for mixing the liquid with water in the flush tank of a toilet seat.

Figure 3 is a plan view of the flush tank with the cover removed to expose the float controlled valve shown in Figure 2.

Referring now to the drawings in which like characters of reference designate similar parts, 10 designates a tank having an opening 11 in the top which is closed by a threaded plug 12. The tank is equipped with a conventional liquid gauge 13 which communicates with the top and the bottom of the tank and indicates the liquid level within the tank. A stand pipe 14 is connected at the top to the bottom of the tank and is connected at the bottom through a distributing pipe 15 having valve controlled branch pipes 16 adapted to deliver the disinfecting contents of the tank to a conventional urinal 17 or other equipment. The water service pipe 18 of the building is connected to the stand pipe 14 and is controlled by a cut off valve 19 so that the contents of the tank 10 may be mixed with water under pressure and delivered to the branch pipes 16 by a by-pass pipe 20, as will presently be described. Adjustment of the valves 16' of the branch pipes controls the rate of discharge of the solution of water and disinfectant.

A tank 21 is located in an elevated position with respect to the tank 10 and an outlet pipe 22 is connected at the upper end to the bottom of the tank 21 and enters the top of the tank 10. The outlet pipe is controlled by a valve 23. The tank 21 is equipped with a filling funnel 24 through which the tank may be supplied with a disinfectant or deodorant, or both. The filling funnel is open to the atmosphere so that atmospheric pressure may force out the contents into the tank 10 and thus, when the water service pipe valve is closed, permit gravity flow of the contents of the tank 10 to the pipes 14, 15 and 16. The tank 21 is equipped with a conventional sight glass 25 which indicates the liquid level in the tank.

The stand pipe 14 is controlled by a valve 26 and the by-pass pipe 20 is controlled by a valve 27. A short pipe 28 rises from the top of the tank 10 and is provided with a cruciform union 29 to one branch of which the by-pass pipe 20 is connected. Pipes 30 and 31 are connected to the remaining branches of the union the former carrying a pressure gauge 32 and the latter carrying an air cock 33.

To fill the system, the valves 19, 26 and 27 are closed, and the air cock 33 and the valve 23 are opened. The disinfecting and deodorizing liquid may be poured into the funnel 24 until the tank 10 is full, or is filled to the desired level. In order, then, to fill the tank 21, the valve 23 is closed, and additional liquid poured into the funnel 24, until the tank 21 is full. If it is desired to use the system as a gravity controlled system, then either (a) the valves 19, 23 and 27 are maintained closed while the valve 26 and the air cock 33 are opened, and thus atmospheric pressure may force out the liquid from the tank 10 through the pipe 14 into the distributing pipe 15 and branch pipes 16, or (b) the air cock 33 and the valves 19 and 27 may be maintained closed while the valves 23 and 26 are opened, and thus atmospheric pressure may force out the liquid from the tank 21 into the tank 10, thence through the pipe 14 into the distributing pipe 15 and branch pipes 16. If the device is to be used to dilute the deodorant and disinfectant the valve 23 is closed to cut off the upper tank 21 and the valve 26 is closed to cut off the tank 10 from the distributing pipe 15. The air cock 33 is also closed. The water service pipe valve 19 is opened whereupon water under pressure will rise through the stand pipe 14, through the tank 10, pipe 28, downward through the by-pass pipe 20, the valve 27 of which has been originally opened, and into the distributing pipe 15 to the discharge pipes 16.

A modified form of the invention is shown in Figures 2 and 3. In this form of the invention the system as above described, is used with the exception that the distributing pipe 34 is provided with a branch pipe 35 which enters the flush tank 36 of a conventional toilet seat 37. The pipe terminates in a faucet 38 the valve 39 of which may be adjusted to regulate the supply of disinfectant and deodorant to the water in the flush tank. A valve 40 is disposed in the pipe 35 within the flush tank and is controlled by a float 41 so that each time the tank is flushed lowering of the float will open the valve 40 and permit discharge of the deodorant and disinfectant into the water of the flush tank as it recedes. When the water in the flush tank rises the float rises with it and when normal water level has been restored will close the valve 40 to shut off further supply of the deodorant and disinfectant to the flush tank.

A pipe 42 is connected at the upper end to the pipe 35 in the flush tank and extends through the bottom of the flush tank where it is connected to the flush pipe 43. A valve 44 controls the pipe 42. The valve 39 of the faucet 38 may be closed if desired to manually regulate the supply of the deodorant and disinfectant to the urinal by adjustment of the valve 44. A draw off cock 45 is connected to the pipe 34 outside of the flush tank so that the disinfectant and deodorant may be drawn off and transported to the distant localities where it is to be used.

From the above description it is thought that the construction and operation of the invention will be fully understood without further explanation.

What is claimed is:

1. Disinfecting and deodorizing apparatus for toilets, urinals and the like, comprising a tank adapted to contain a disinfectant, a stand pipe connected to the tank, distributing pipes connected to the stand pipe, a manually operable air cock connected with the tank, a water service pipe connected with the stand pipe, a manually operable valve controlling the service pipe, a by-pass pipe connected with the tank and with the stand pipe around the water service pipe, a manually operable valve in the stand pipe between the service pipe and the distributing pipes, and a manually operable valve controlling the by-pass pipe, closing of the service pipe valve and opening of the air cock and the stand pipe valve permitting escape of the disinfectant from the tank by gravity through the stand pipe, and opening of the valve in the service pipe together with closing the air cock and closing the stand pipe valve and opening the valve in the by-pass pipe permitting the water from the service pipe to dilute the disinfectant in the tank and permit the resultant solution to pass through the by-pass pipe into the stand pipe for discharge through the distributing pipes.

2. Disinfecting and deodorizing apparatus for toilets, urinals and the like, comprising a tank adapted to contain a disinfectant, a stand pipe connected to the tank, distributing pipes connected to the stand pipe, a manually operable air cock connected with the tank, a water service pipe connected with the stand pipe, a manually operable valve controlling the service pipe, a by-pass pipe connected with the tank and with the stand pipe around the water service pipe, a manually operable valve controlling the by-pass pipe, and a valve controlling the stand pipe below the service pipe, adjustment of the last named valve determining the rate of discharge of disinfectant from the tank through the stand pipe either by gravity when the air cock is opened, or by pressure when the air cock is closed and both the service pipe valve and the by-pass valve are opened.

3. Disinfecting and deodorizing apparatus comprising a tank, a stand pipe connected to the tank, distributing pipes connected to the stand pipe, a second tank elevated above the tank, means for filling the second tank with deodorizing and disinfecting liquid, a valve controlled pipe connecting the second tank with the first named tank, liquid level gauges for both tanks, opening of said valve permitting of the first tank being filled from the second tank, a manually operable air cock connected with the first named tank, permitting of the contents of the tank to escape through the stand pipe when said valve is closed, a valve controlled service pipe, a valve in the stand pipe below the service pipe, and means for by-passing the water from the service pipe through the first tank into the stand pipe when the air cock is closed to permit water from the service pipe under pressure to dilute the contents of the first tank and supply the same to the stand pipe.

ANTONE NUNES VIERRA.